US012126619B2

(12) United States Patent
Freedman et al.

(10) Patent No.: US 12,126,619 B2
(45) Date of Patent: Oct. 22, 2024

(54) POINT OF SALE CONTROLLING SYSTEM

(71) Applicant: Toshiba Global Commerce Solutions, Inc., Durham, NC (US)

(72) Inventors: Sharon Freedman, Durham, NC (US); Amir Najari, Durham, NC (US); Mina Lee, Durham, NC (US); Monsak Chirakansakcharoen, Durham, NC (US); Steve Chandler, Durham, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 276 days.

(21) Appl. No.: 17/656,832

(22) Filed: Mar. 28, 2022

(65) Prior Publication Data

US 2023/0328060 A1  Oct. 12, 2023

(51) Int. Cl.
*H04L 9/40* (2022.01)
*G06Q 20/20* (2012.01)

(52) U.S. Cl.
CPC ......... *H04L 63/0876* (2013.01); *G06Q 20/20* (2013.01); *H04L 63/101* (2013.01)

(58) Field of Classification Search
CPC ..... H04L 63/08; H04L 63/0876; H04L 63/10; H04L 63/101; G06Q 20/20
See application file for complete search history.

(56) References Cited

U.S. PATENT DOCUMENTS

| | | | |
|---|---|---|---|
| 7,343,441 B1 * | 3/2008 | Chrysanthakopoulos | H04L 12/40123 709/236 |
| 8,502,690 B2 | 8/2013 | Takizawa | |
| 10,452,383 B1 * | 10/2019 | Maibach | G06F 11/0751 |
| 11,302,173 B1 * | 4/2022 | Katz | G08B 25/14 |
| 11,909,845 B2 * | 2/2024 | Shim | H04L 67/59 |
| 2010/0025460 A1 * | 2/2010 | Sutton | G06Q 20/325 235/379 |
| 2010/0115624 A1 * | 5/2010 | Coppinger | H04L 67/12 726/27 |
| 2011/0172960 A1 | 7/2011 | St. George et al. | |
| 2013/0311313 A1 * | 11/2013 | Laracey | G06Q 20/3278 705/16 |

(Continued)

OTHER PUBLICATIONS

Definition of Authentication by nist.gov (Year: 2021).*

*Primary Examiner* — Boris D Grijalva Lobos

(74) *Attorney, Agent, or Firm* — Kaufman & Canoles, P.C.

(57) ABSTRACT

Systems and methods of controlling a point of sale (POS) device are provided. In one exemplary embodiment, a method comprises, by a first network node that is operationally coupled to a POS device over a one-to-one connection, with the POS device being operable to receive commands related to secured and unsecured functions of the POS device that are sent to the first network node over the network and then conditionally sent by the first network node to the POS device over the one-to-one connection, receiving, from the second network node, an indication that includes both a command related to the POS device and a network node identifier associated with the second network node so that the first network node is enabled to authorize the second network node to send the command to the POS device based on the network node identifier and an authorized network node identifier.

17 Claims, 11 Drawing Sheets

(56) References Cited

U.S. PATENT DOCUMENTS

| | | | | |
|---|---|---|---|---|
| 2015/0178730 A1* | 6/2015 | Gleeson | ............ | G06Q 20/3829 |
| | | | | 705/72 |
| 2017/0285707 A1* | 10/2017 | Cohen | .................... | G06F 1/266 |
| 2019/0260712 A1* | 8/2019 | Waterman | ............ | H04L 63/164 |
| 2022/0036336 A1* | 2/2022 | Goolkasian | ............ | H04L 67/34 |

* cited by examiner

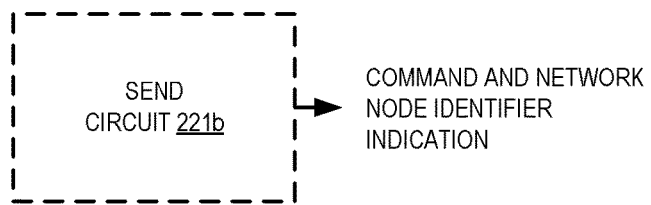
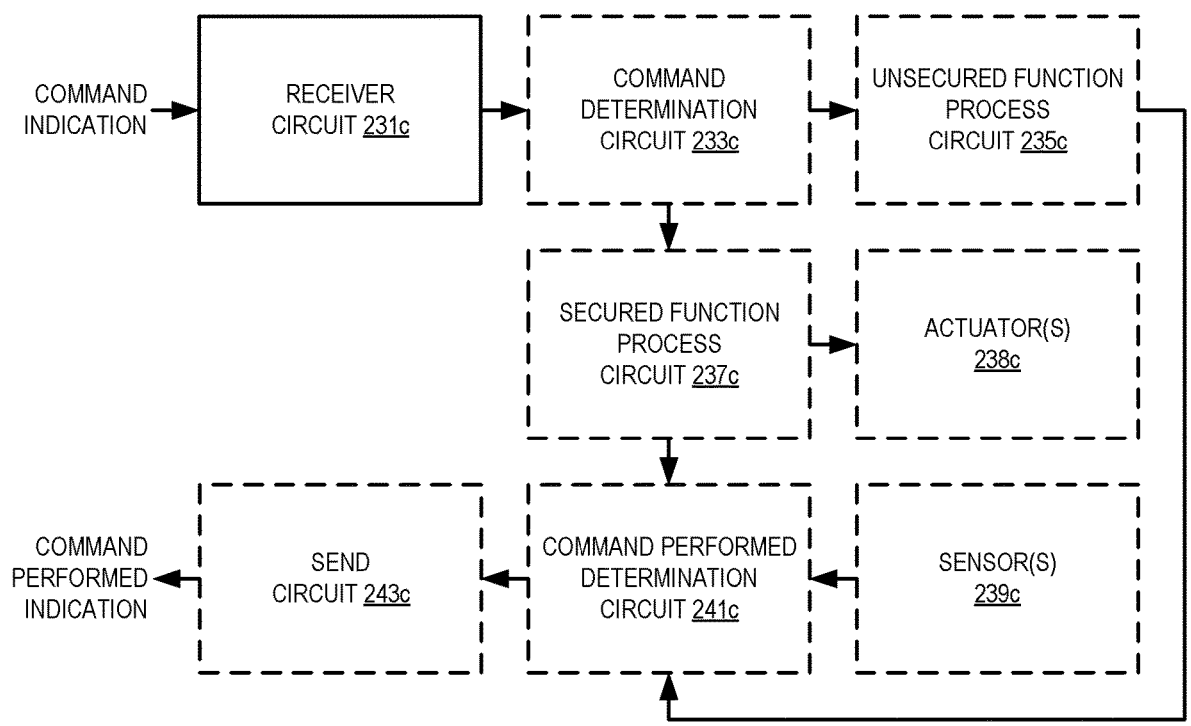
FIG. 2B
FIG. 2C

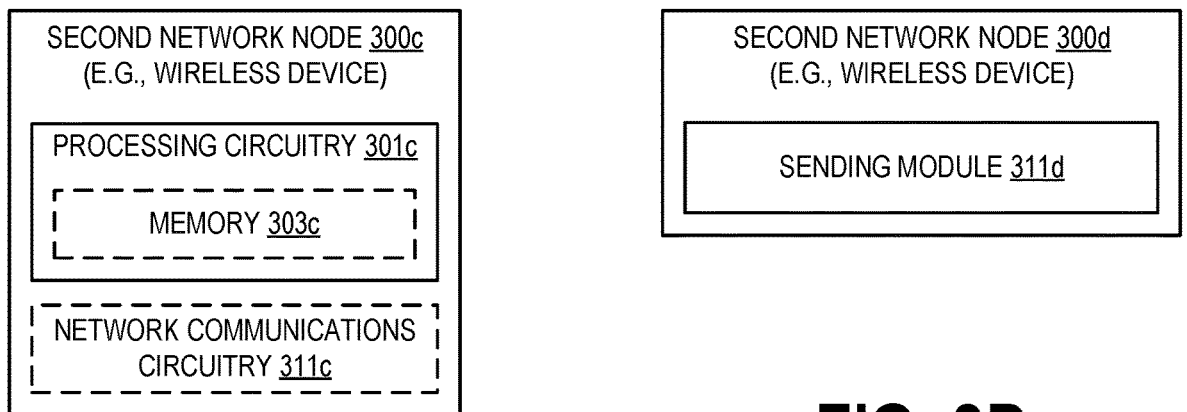

400b

BY A SECOND NETWORK NODE THAT IS OPERATIONALLY COUPLED TO A FIRST NETWORK NODE OVER A NETWORK, WITH THE FIRST NETWORK NODE BEING OPERATIONALLY COUPLED TO A POS DEVICE OVER A ONE-TO-ONE CONNECTION, WITH THE POS DEVICE BEING OPERABLE TO RECEIVE COMMANDS RELATED TO SECURED AND UNSECURED FUNCTIONS OF THE POS DEVICE THAT ARE SENT BY THE SECOND NETWORK NODE TO THE FIRST NETWORK NODE OVER THE NETWORK AND THEN CONDITIONALLY SENT BY THE FIRST NETWORK NODE TO THE POS DEVICE OVER THE ONE-TO-ONE CONNECTION, SEND, TO THE FIRST NETWORK NODE, AN INDICATION THAT INCLUDES BOTH A COMMAND ASSOCIATED WITH THE POS DEVICE AND A NETWORK NODE IDENTIFIER ASSOCIATED WITH THE SECOND NETWORK NODE SO THAT THE FIRST NETWORK NODE IS ENABLED TO AUTHORIZE THE SECOND NETWORK NODE TO SEND THE COMMAND TO THE POS DEVICE BASED ON THE NETWORK NODE IDENTIFIER AND AN AUTHORIZED NETWORK NODE IDENTIFIER THAT REPRESENTS A NETWORK NODE THAT IS AUTHORIZED TO SEND A COMMAND ASSOCIATED WITH THE SECURED FUNCTION TO THE POS DEVICE

POINT OF SALE CONTROLLING SYSTEM

BACKGROUND

A point of sale (POS) device used in retail stores typically includes a POS terminal, a POS printer, and a cash drawer for holding currency. The cash drawer is typically associated with a secured function of the POS device since the cash drawer can include a lock mechanism to hold the cash drawer secure inside the POS device until the POS device releases the lock actuator so that the cash drawer can open. The POS printer can typically be accessed by various devices over a network to perform various unsecured functions such printing a retail transaction receipt. However, such network access to the POS printer exposes the POS device to potential hackers. While an unauthorized user or device printing a receipt may not be a significant security event, an unauthorized user or device opening a cash drawer would likely be a significant security event.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIGS. 2A-C illustrate embodiments of a first network node, a second network node, and a POS device, respectively, in accordance with various aspects as described herein.

FIGS. 3C-D illustrate embodiments of a second network node in accordance with various aspects as described herein.

FIGS. 4A-C illustrate embodiments of a method performed by a first network node, second network node and a POS device, respectively, of controlling a POS device in accordance with various aspects as described herein.

DETAILED DESCRIPTION

Figure 1:
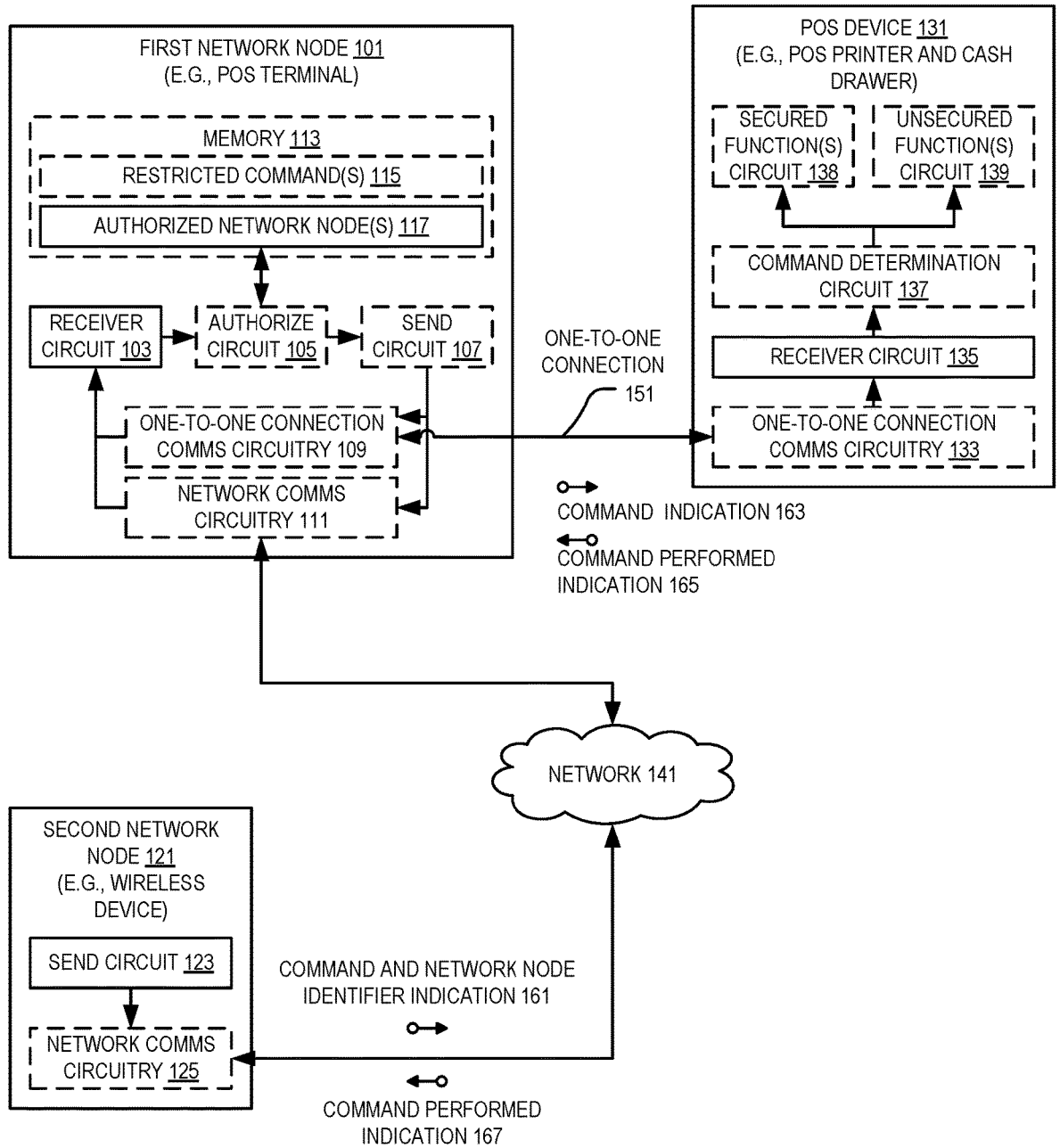
FIG. 1 illustrates one embodiment of a system of controlling a POS device in accordance with various aspect as described herein.

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

In this disclosure, systems and methods of controlling a POS device are provided. A POS device typically includes a POS terminal, a POS printer, and a cash drawer. The POS printer includes the ability to control the cash drawer so that a personal computer (PC) can be used as the POS terminal to control the point-of-sale without requiring other inputs and/or outputs. There has traditionally been a one-to-one connection (e.g., parallel connection, serial connection, universal serial bus (USB) connection, or the like) between the POS terminal and the POS printer. Under this one-to-one connection structure, only retail store personnel would be allowed to access the POS terminal to perform financial transactions such as printing receipts by the POS printer and accessing the cash drawer.

However, with the more recent adoption of POS devices having a communication interface to a wired network (e.g., Ethernet) or a wireless network (e.g., WiFi, Bluetooth, cellular, nearfield, or the like), network nodes (e.g., PCs, tablets, smartphones, servers, tablets, or the like) can be used to access these POS devices over such network(s) to perform certain transactions (e.g., financial transactions). For instance, a retail customer's smartphone communicates with a retailer's POS device over a network to print a receipt by a corresponding POS printer. Network nodes can typically communicate with most printers using a common printer protocol such as the Epson Standard Code for Printers (ESC/P) control protocol over port 9100. The use of the ESC/P control protocol exposes the POS printer to hacking via a network node such as a hacker sending ESC/P commands directly from a network node to a POS printer. While the security risk of an unauthorized access of a POS printer may be limited, the security risk associated with an unauthorized access of a cash drawer is problematic if not catastrophic. Accordingly, in one or more embodiments described herein, there is a need for improved techniques of controlling a POS device. Further, embodiments described herein include, among other things, improved techniques to enable network nodes to perform secured functions associated with accessing a cash drawer of a POS device while enabling them to perform unsecured functions associated with a POS printer of that device. In addition, other desirable features and characteristics of the present disclosure will become apparent from the subsequent detailed description and embodiments, taken in conjunction with the accompanying figures and the foregoing technical field and background.

In one exemplary embodiment, a POS system includes a first network node (e.g., POS terminal) communicatively coupled to a POS device over a one-to-one connection (e.g., UART, USB, SPI, I2C, Bluetooth, nearfield, or the like). The first network node is also communicatively coupled to other network nodes over a network (e.g., Ethernet, Wifi, Internet, or the like). The first network node is configured with a list of authorized users/devices (e.g., username, password, Internet Protocol (IP) addresses, network hostnames) that are authorized to access the cash drawer of the POS device. For instance, this configuration could be performed when the POS printer is initially configured. The first network node would then control which other network nodes have access to the cash drawer based on the list of authorized users/devices, with authorized users/devices having access to the cash drawer and unauthorized users/devices being blocked from accessing the cash drawer.

In another exemplary embodiment, contemporaneous with configuring the POS printer of the POS device, the first network node (e.g., POS terminal) receives configuration information associated with the POS printer. The configuration information also includes an authorized network device list and a restricted command list. The authorized network device list includes the IP addresses of all authorized network devices that have full access to the printer command set of the POS device. The restricted command list includes a set of commands that only the authorized network devices can access. In one example, the restricted command list includes a command associated with accessing the cash drawer. In another example, the restricted command list includes a command associated with printing a Quick Response (QR) code on a sales receipt. In operation, when the first network node receives a command from another network device, the first network device determines whether the IP address of the other network device is in the authorized network device list. If so, then the POS device executes any commands sent by the other network node. Otherwise, the first network node determines whether that command is in the restricted command list. If in the restricted command list, then the POS device does not execute that command. If not in the restricted command list, then the POS device executes that command.

FIG. 1 illustrates one embodiment of a system 100 of controlling a POS device 131 in accordance with various aspect as described herein. In FIG. 1, the system 100 includes a first network node 101 (e.g., POS terminal) operatively coupled to the POS device 131 over a one-to-one connection 151. The one-to-one connection 151 can be a wireless connection such as a peer-to-peer connection (e.g., Bluetooth, WiFi, cellular, nearfield, or the like) or a wired connection such as a serial connection (e.g., USB, UART, SPI, 12C, or the like). The first network node 101 can be geographically separated from or co-located with the POS device 131. Further, the first network node 101 can be communicatively coupled to multiple POS devices 131 over corresponding one-to-one connections. In addition, the first network node 101 is operatively coupled to a second network node 121 over a network 141 (e.g., Internet, Ethernet, WiFi, cellular, or the like).

In operation, the first network node 101 receives from the second network node 121 over the network 141 an indication 161 that includes both a command associated with the POS device 131 and a network node identifier associated with the second network node 121. The first network node 101 authorizes the second network node 121 to send the command to the POS device 131 based on the network node identifier and an authorized network node identifier 117 that represents a network node that is authorized to send a command associated with the secured function (e.g., cash drawer access) to the POS device 131. To authorize, the first network node 101 may determine whether the network node identifier corresponds to the authorized network node identifier 117. If so, the first network node 101 sends to the POS device 131 over the one-to-one connection 151 an indication 163 of the command. Otherwise, the first network node 101 determines whether the command corresponds to a restricted command 115 that represents a command associated with the secured function of the POS device 131 that requires a network node to be authorized to send that command to the POS device 131. If the command is a restricted command 115, then the first network node 101 will not send the command to the POS device 131. However, if the command is not a restricted command 115, then the first network node 101 will send the command to the POS device 131. In response to sending the command, the first network node 101 may receive from the POS device 131 over the one-to-one connection 151 an indication 165 that the command was performed by the POS device 131. The first network node 101 may then send to the second network node 121 over the network 141 an indication 167 that the command was performed by the POS device.

In FIG. 1, the first network node 101 includes a receiver circuit 103, an authorization circuit 105, a send circuit 107, one-to-one connection communications circuitry 109, network communications circuitry 111, a memory 113, the like, or any combination thereof. The receiver circuit 103 is configured to receive information from the one-to-one connection communications circuitry 109 and the network communications circuitry 111. The authorization circuit 105 is configured to conditionally send a command (via authorization of that command) to the POS device 131. The send circuit 107 is configured to send information to the one-to-one connection communications circuitry 109 and the network communications circuitry 111. The one-to-one connection communications circuitry 109 is configured to communicate information with the POS device 131 over the one-to-one connection 151 via any one-to-one wired or peer-to-peer wireless communication technology. The network communications circuitry 111 is configured to communicate information with the second network node 121 over the network 141 via any communication technology. The memory 113 is configured to include restricted command(s) 115 and authorized network node identifier(s) 117.

In the current embodiment, the second network node 121 includes a send circuit 123, a network communications circuit 125, the like, or any combination thereof. The send circuit 123 is configured to send information to the network communications circuitry 125. The network communications circuitry 125 is configured to send information over the network 141 such as to the first network node 101. The POS device 131 includes a one-to-one connection communications circuit 133, a receiver circuit 135, a command determination circuit 137, a secured function circuit 138, an unsecured function circuit 139, the like, or any combination thereof. The one-to-one connection communications circuit is configured to communicate information to the POS device 131 over the one-to-one connection 151. The receiver circuit 135 is configured to receive information from the one-to-one connection communications circuit 133. The command determination circuit 137 is configured to determine whether the command is associated with a secured function or an unsecured function. The secured function processing circuit 138 is configured to process a command associated with the secured function. The unsecured function processing circuit 139 is configured to process a command associated with the unsecured function.

Figure 2A:
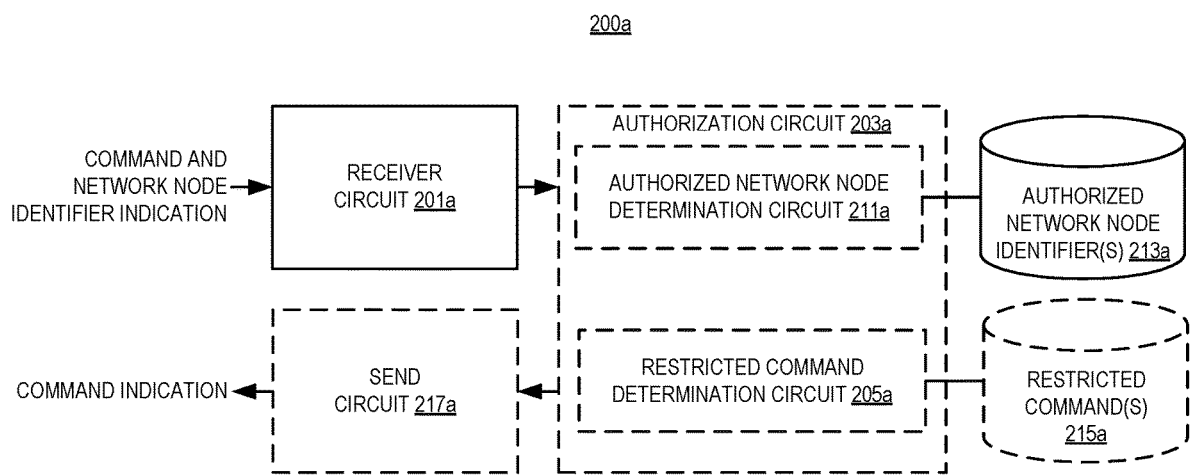

FIGS. 2A-C illustrate embodiments of a first network node 200a, a second network node 200b, and a POS device 200c, respectively, in accordance with various aspects as described herein. In FIG. 2A, the device 200a implements various functional means, units, or modules (e.g., via the processing circuitry 301a in FIG. 3A, via the processing circuitry 501a in FIG. 5A, via software code, or the like), or circuits. In one embodiment, these functional means, units, modules, or circuits (e.g., for implementing the method(s) herein) may include for instance: a receiver circuit 201a operable to receive, from the second network node 200b, an indication that includes both a command associated with the POS device 200c and a network node identifier associated with the second network node 200b; an authorization circuit 203a operable to authorize the second network node 200b to send the command to the POS device 200c based on the network node identifier and the authorized network node identifier 213a; a restricted command determination circuit 205a operable to determine that the command corresponds to a restricted command 215a; an authorized network node determination circuit 211a operable to determine that the second network node identifier corresponds to the authorized network node identifier 213a; and a send circuit 217a operable to send, to the POS device 200c over the one-to-one direct connection, an indication of the command.

In FIG. 2B, the device 200b implements various functional means, units, or modules (e.g., via the processing circuitry 301c in FIG. 3C, via the processing circuitry 501a in FIG. 5A, via software code, or the like), or circuits. In one embodiment, these functional means, units, modules, or circuits (e.g., for implementing the method(s) herein) may include, for instance, a send circuit 221b operable to send, to the first network node 200a, an indication that includes both a command associated with the POS device 200c and a network node identifier associated with the second network node 200b so that the second network node 200b can be authorized by the first network node 200a to send the command to the POS device 200c based on the network node identifier and an authorized network node identifier 213a that represents a network node that is authorized to send a command associated with the secured function to the POS device 200c.

In FIG. 2C, the device 200c implements various functional means, units, or modules (e.g., via the processing circuitry 301d in FIG. 3D, via the processing circuitry 501b in FIG. 5B, via software code, or the like), or circuits. In one embodiment, these functional means, units, modules, or circuits (e.g., for implementing the method(s) herein) may include for instance: a receiver circuit 231c operable to receive, from the first network node 200a over the one-to-one connection, an indication of a command associated with the POS device 200c; a command determination circuit 233c operable to determine whether the command corresponds to the secured or unsecured function of the POS device 200c; an unsecured function process circuit 235c operable to perform an unsecured command; a secured function process circuit 237c operable to perform the secured command; a command performed determination circuit 241c operable to determine that the command was performed based on a sensor indication received from a sensor 239c (e.g., drawer open/close sensor); a command performed determination circuit 241c operable to determine that the command was performed; and a send circuit 243c operable to send, by the POS device 200c, to the first network node 200a, an indication that the command was performed.

In another embodiment, for a secured function command associated with opening/closing or locking/unlocking a cash drawer of the POS device, the secured function process circuit 237c performs a command that requires sending an indication to an actuator 238c to open/close or lock/unlock a corresponding cash drawer. A skilled artisan will readily recognize techniques for configuring an actuator to open/close or lock/unlock a cash drawer.

In another embodiment, for a secured function command associated with opening/closing or locking/unlocking a cash drawer of the POS device, the command performed determination circuit 241c receives from a sensor 239c an indication that the cash drawer was opened or closed. In response, the send circuit 243c sends to the first network node 243a an indication that the command was performed. A skilled artisan will readily recognize techniques for configuring a sensor with a cash drawer so that an indication from that sensor enables determining whether the cash register is open/closed or locked/unlocked.

Figure 3A:
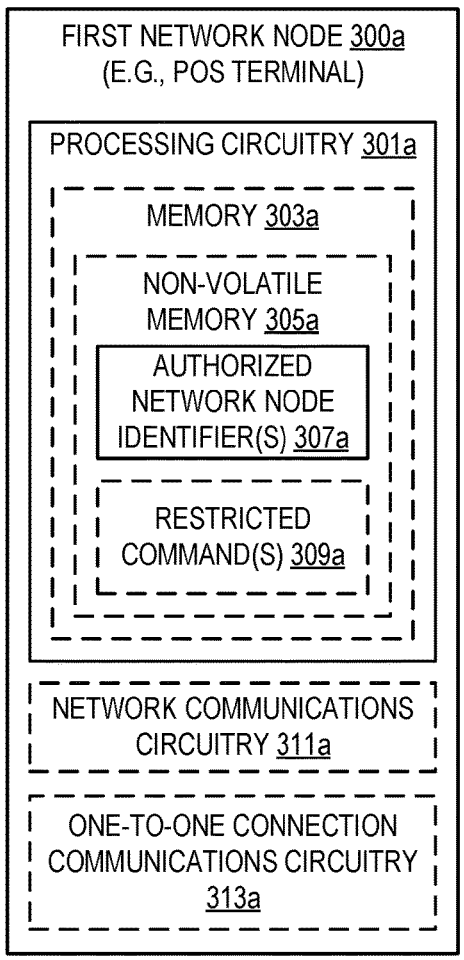
FIGS. 3A-B illustrate embodiments of a first network node in accordance with various aspects as described herein.
Figure 3B:
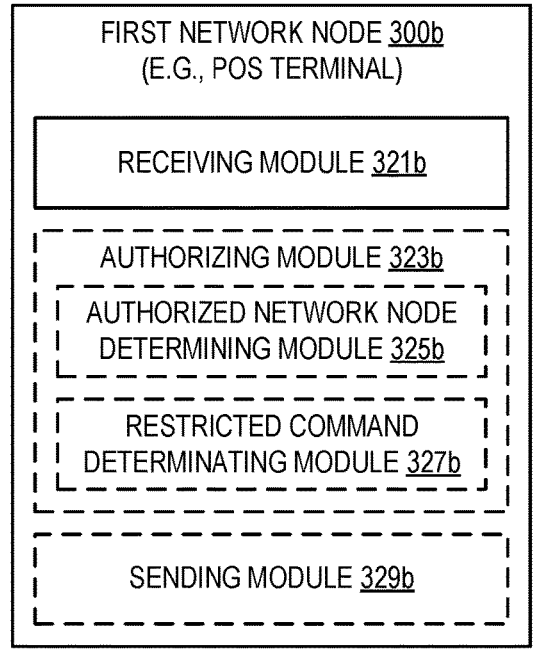

FIGS. 3A-B illustrate embodiments of a first network node 300a-b in accordance with various aspects as described herein. In FIG. 3A, the device 300a may include processing circuitry 301a that is operably coupled to one or more of the following: memory 303a, network communications circuitry 311a, one-to-one connection communications circuitry 313a. The network communication circuitry 311a is configured to transmit and/or receive information to and/or from one or more other network nodes over a network via any communication technology. The one-to-one connection communications circuitry 313a is configured to transmit and/or receive information between the first network node 300a and a POS device via a one-to-one connection. The processing circuitry 301a is configured to perform processing described herein, such as by executing instructions and accessing information stored in memory 303a. The memory 303a is configured to include non-volatile memory 305a that is configured to include an authorized network node identifier(s) 307a and may include restricted command(s) 309a. The processing circuitry 303a in this regard may implement certain functional means, units, or modules.

Figure 5A:
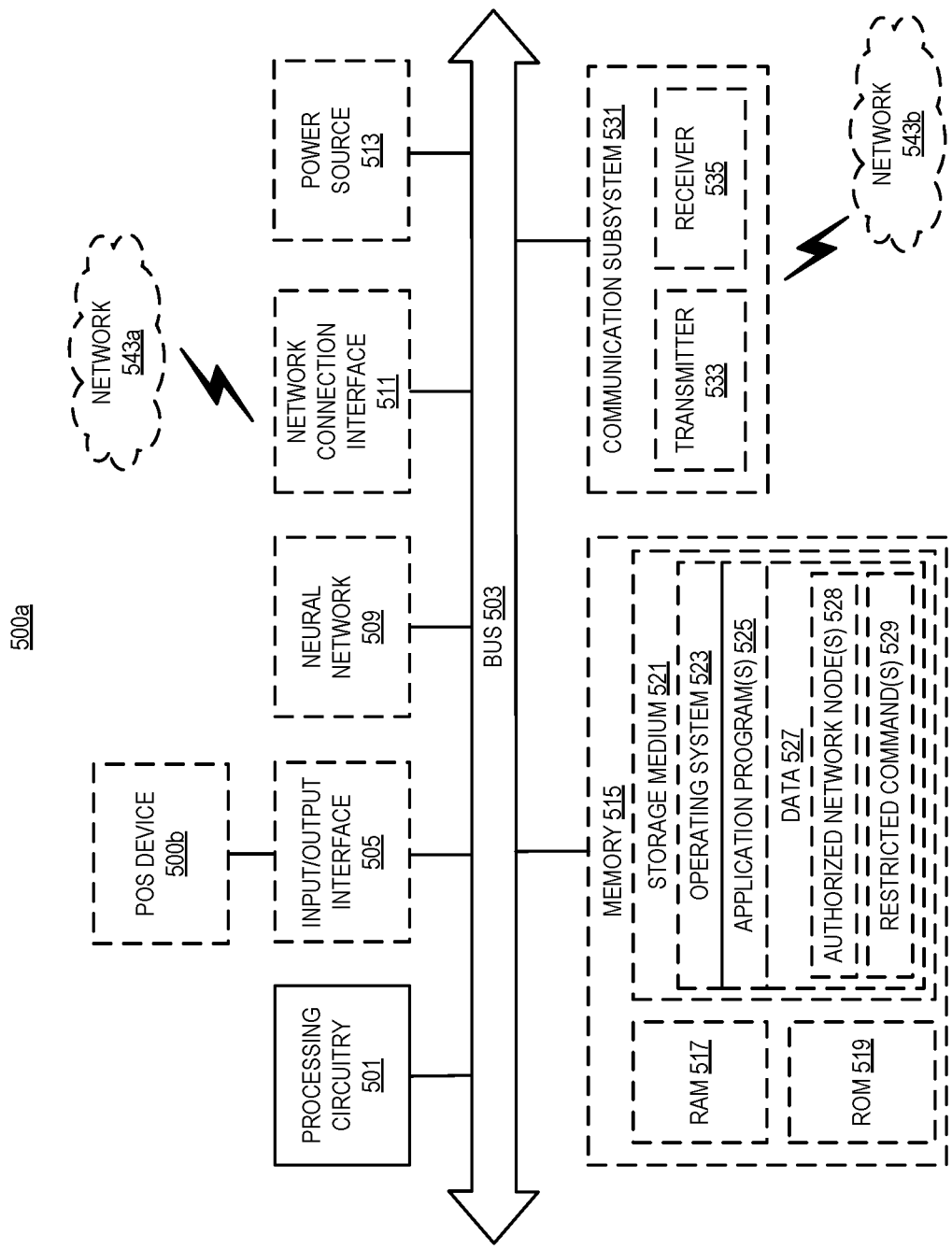
FIGS. 5A-B illustrate other embodiments of a network node and a POS device, respectively, in accordance with various aspects as described herein.

In FIG. 3B, the device 300b implements various functional means, units, or modules (e.g., via the processing circuitry 301a in FIG. 3A, via the processing circuitry 501a in FIG. 5A, via software code, or the like). In one embodiment, these functional means, units, or modules (e.g., for implementing the method(s) described herein) may include for instance: a receiving module 321b for receiving, from a network node, an indication that includes both a command associated with the POS device and an identifier associated with a network node; an authorizing module 323b for authorizing a network node to send a command to the POS device based on the network node identifier and the authorized network node identifier; an authorized network node determining module 325b for determining that a network node identifier corresponds to an authorized network node identifier(s) 307a; a restricted command determining module 327b for determining that the command corresponds to a restricted command(s) 309a that requires a network node to be authorized to send that command to the POS device; and a sending module 329b for sending, to the POS device over the one-to-one direct connection, an indication of the command.

FIGS. 3C-D illustrate embodiments of a second network node 300c-d in accordance with various aspects as described herein. In FIG. 3C, the device 300c may include processing circuitry 301c that is operably coupled to one or more of the following: memory 303c, network communications circuitry 311c. The network communication circuitry 311c is configured to transmit and/or receive information to and/or from one or more other network nodes over a network via any communication technology. The processing circuitry 301c is configured to perform processing described herein, such as by executing instructions and accessing information stored in memory 303c. The processing circuitry 301c in this regard may implement certain functional means, units, or modules.

In FIG. 3D, the device 300d implements various functional means, units, or modules (e.g., via the processing circuitry 301c in FIG. 3C, via the processing circuitry 501a in FIG. 5A, via software code, or the like). In one embodiment, these functional means, units, or modules (e.g., for implementing the method(s) described herein) may include, for instance, a sending module 311d for sending, to the first network node, an indication that includes both a command associated with the POS device and an identifier associated with the second network node so that the first network node is enabled to authorize the second network node to send the command to the POS device based on the network node identifier and an authorized network node identifier that represents a network node that is authorized to send a command associated with the secured function to the POS device.

Figure 3E:
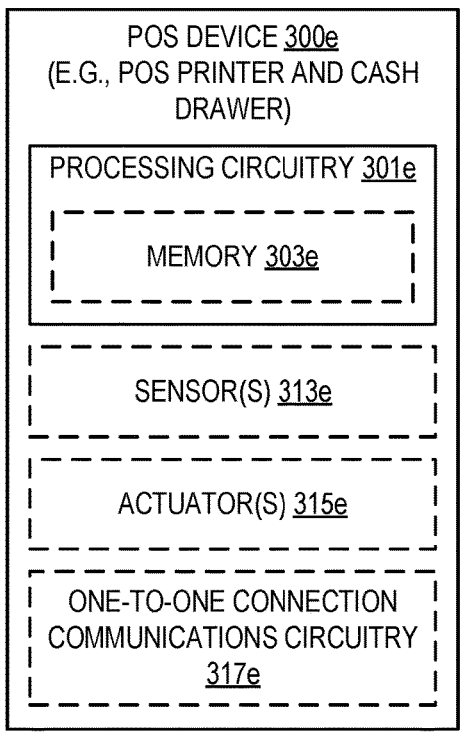
FIGS. 3E-F illustrate embodiments of a POS device in accordance with various aspects as described herein.
Figure 3F:
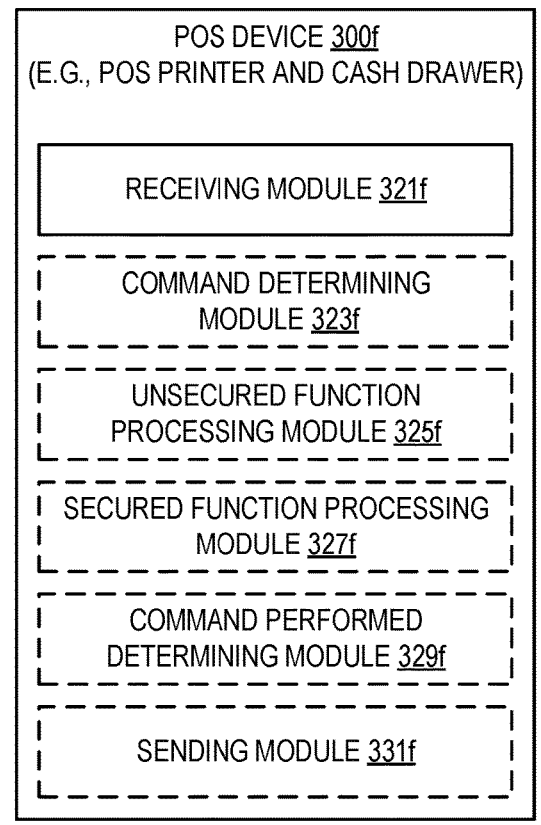

FIGS. 3E-F illustrate embodiments of a POS device 300e-f in accordance with various aspects as described herein. In FIG. 3E, the device 300e includes processing circuitry 301e that is operably coupled to one or more of the following: memory 303e, sensor(s) 313e, actuator(s) 315e, one-to-one connection communications circuitry 317e. The one-to-one connection communications circuitry 317e is configured to transmit and/or receive information between the first network node 300a and the POS device 300e over a one-to-one wired or peer-to-peer wireless communication link, channel, connection, coupling, or the like. The processing circuitry 301e is configured to perform processing described herein, such as by executing instructions and accessing information stored in memory 303e. The processing circuitry 303e in this regard may implement certain functional means, units, or modules.

Figure 5B:
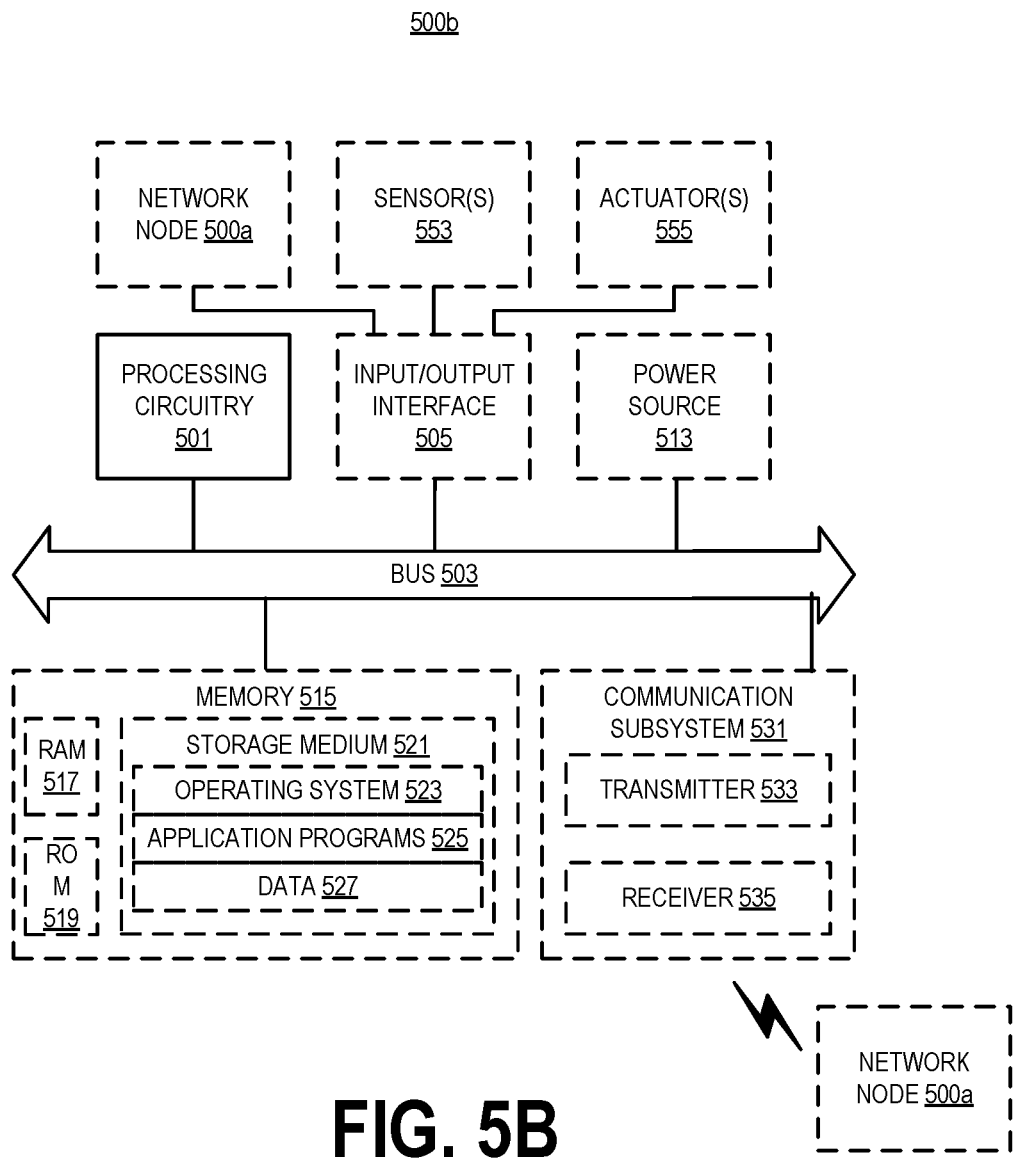

In FIG. 3F, the device 300f implements various functional means, units, or modules (e.g., via the processing circuitry 301e in FIG. 3E, via the processing circuitry 501b in FIG. 5B, via software code, or the like). In one embodiment, these functional means, units, or modules (e.g., for implementing the method(s) described herein) may include for instance: a receiving module 321f for receiving, from the first network node 200a over the one-to-one connection, an indication of a command associated with the POS device; a command determining module 323f for determining whether a command corresponds to a secured or unsecured function of the POS device 300f; an unsecured function processing module 325f for performing an unsecured command; a secured function processing module 327f for performing a secured command; a command performed determining module 329f operable to determine whether a command was performed; and a sending module 331f for sending, to the first network node, an indication that a command was performed.

Figure 4A:
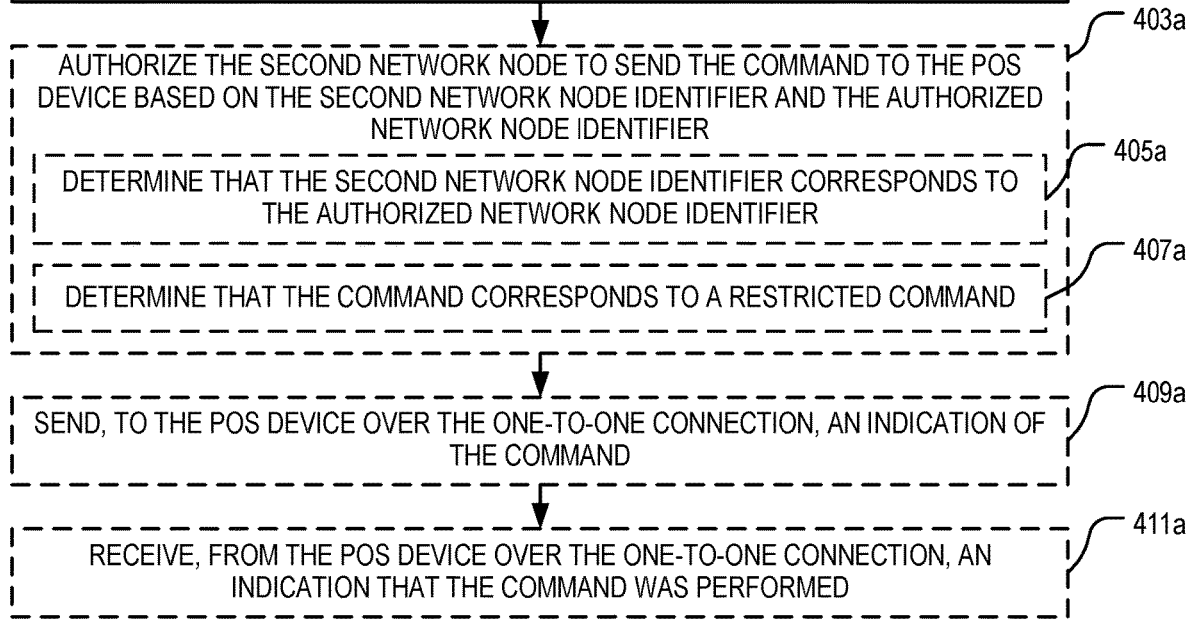

FIG. 4A illustrates one embodiment of a method 400a performed by a first network node 101, 200a, 300a-b, 500a of controlling a POS device in accordance with various aspects as described herein. In FIG. 4A, the method 400a may start, for instance, at block 401a where it includes receiving, from a second network node an indication that includes both a command associated with the POS device and an identifier associated with the second network node so that the first network node is enabled to authorize the second network node to send the command to the POS device based on the network node identifier and an authorized network node identifier that represents a network node that is authorized to send a command associated with the secured function to the POS device. At block 403a, the method 400a may include authorizing the second network node to send the command to the POS device based on the second network node identifier and the authorized network node identifier. At block 405a, the method 400a may include determining that the second network node identifier corresponds to the authorized network node identifier. At block 407a, the method 400a may include determining that the command corresponds to a restricted command that corresponds to a command associated with the secured function of the POS device that requires a network node to be authorized to send that command to the POS device. At block 409a, the method 400a may include sending, to the POS device over the one-to-one connection, an indication of the command. In addition, the method 400a may include receiving, from the POS device over the one-to-one connection, an indication that the command was performed, as represented by block 411a.

FIG. 4B illustrates one embodiment of a method 400b performed by a second network node 121, 200b, 300c-d, 500a of controlling a POS device in accordance with various aspects as described herein. In FIG. 4B, the method 400b may start, for instance, at block 401b where it includes sending, to a first network node, an indication that includes both a command associated with the POS device and an identifier associated with the second network node so that the first network node is enabled to authorize the second network node to send the command to the POS device based on the network node identifier and an authorized network node identifier that represents a network node that is authorized to send a command associated with the secured function to the POS device.

Figure 4C:
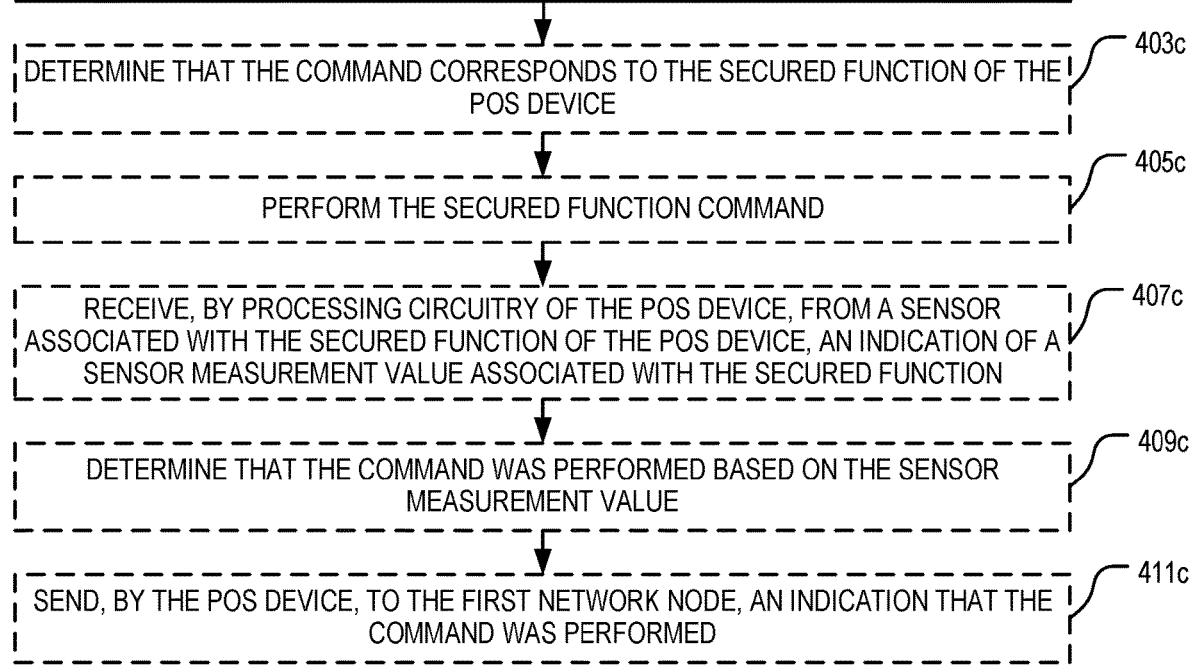

FIG. 4C illustrates one embodiment of a method 400c performed by a POS device 131, 200c, 300d-e, 500b in accordance with various aspects as described herein. In FIG. 4C, the method 400c may start, for instance, at block 401c where it includes receiving, from the first network node over the one-to-one connection, an indication of a command associated with the POS device, with the first network node being operable to authorize the second network node to send the command to the POS device based on a network node identifier and an authorized network node identifier that represents a network node that is authorized to send a command associated with the secured function to the POS device. At block 403c, the method 400c may include determining that the command corresponds to the secured function of the POS device. At block 405c, the method 400c may include performing the command. At block 407c, the method 400c may include receiving, by processing circuitry of the POS device, from a sensor associated with the secured function of the POS device, an indication of a sensor measurement value associated with the secured function of the POS device (e.g., opening/closing or locking/unlocking a cash drawer). At block 409c, the method 400c may include determining that the command was performed based on the sensor measurement value. In addition, the method 400c may include sending, to the first network node, an indication that the command was performed, as referenced by block 411c.

FIG. 5A illustrates another embodiment of a network node device 500a in accordance with various aspects as described herein. In FIG. 5A, device 500a includes processing circuitry 501 that is operatively coupled to input/output interface 505, neural network circuit 509, network connection interface 511, power source 513, memory 515 including random access memory (RAM) 517, read-only memory (ROM) 519, and storage medium 521 or the like, communication subsystem 531, and/or any other component, or any combination thereof. Storage medium 521 may include operating system 523, application program(s) 525, data 527, authorized network node(s) data 528, and restricted command(s) data 529. In other embodiments, storage medium 521 may include other similar types of information. Certain network node devices may utilize all of the components shown in FIG. 5A and FIG. 5B, or only a subset of the components. The level of integration between the components may vary from one device to another device. Further, certain devices may contain multiple instances of a component, such as multiple processors, memories, neural networks, network connection interfaces, transceivers, etc.

In FIG. 5A, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. The device 500a may be configured to use an output device via input/output interface 505. An output device may use the same type of interface port as an input device. For example, a serial port (e.g., UART, USB, I2C, SPI) may be used to provide one-to-one direct communications between the network node device 500a and the POS node device 500b. Further, the output device may be a speaker, a sound card, a video card, a display, a monitor, a printer, an actuator, an emitter, a smartcard, a light emitting element (LED) display, another output device, or any combination thereof. The device 500a may be configured to use an input device via input/output interface 505 to allow a user to capture information into the device 500a. The input device may include a touch-sensitive or presence-sensitive display, an image sensor 561, (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5A, the neural network 509 may be configured to learn to perform tasks by considering examples such as performing image recognition of produce based on training images of different produce (e.g., fruits, vegetables, retail goods). The network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as bar code decoder, a widget or gadget engine or another application, a data file 527, an authorized network node identifier(s) 528, and a restricted command(s) 529. The storage medium 521 may store, for use by the device 500a, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500 to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

In FIG. 5A, the processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500.

FIG. 5B illustrates another embodiment of a POS device 500b in accordance with various aspects as described herein. In FIG. 5B, device 500b includes processing circuitry 501 that is operatively coupled to input/output interface 505, power source 513, memory 515 including random access memory (RAM) 517, read-only memory (ROM) 519, and storage medium 521, communication subsystem 531, and/or any other component, or any combination thereof. Storage medium 521 may include operating system 523, application program 525, data 527, or the like. Certain POS devices may utilize all of the components shown in FIG. 5A and FIG. 5B, or only a subset of the components. The level of integration between the components may vary from one device to another device. Further, certain devices may contain multiple instances of a component, such as multiple processors, memories, neural networks, network connection interfaces, transceivers, etc.

In the depicted embodiment, input/output interface 505 may be configured to provide a communication interface to network node 500a. For example, a serial port (e.g., UART, USB, 12C, SPI) may be used to provide input to and output from the device 500a. Further, the input/output interface 505 may be configured to provide a communication interface to an actuator 555 such as an actuator associated with opening/closing or locking/unlocking a cash register of the POS device 500b. The device 500b may also be configured to provide a communication interface to a sensor 553 such as a sensor associated with determining whether a cash register of the POS device 500b is opened/closed or locked/unlocked. The features, benefits and/or functions described herein may be implemented in one of the components of the device 500b or partitioned across multiple components of the device 500b.

Those skilled in the art will also appreciate that embodiments herein further include corresponding computer programs.

In one exemplary emo computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or network types for illustrative purposes, but the embodiments are similarly applicable in other contexts and/or network types not explicitly described.

In one exemplary embodiment, a method is performed by a first network node that is operationally coupled to a second network node over a network and coupled to a POS device over a one-to-one connection. Further, the POS device is operable to receive commands related to secured and unsecured functions of the POS device that are sent by the second network node to the first network node over the network and then conditionally sent by the first network node to the POS device over the one-to-one connection. The method comprises receiving, from the second network node, an indication that includes both a command related to the POS device and a network node identifier associated with the second network node so that the first network node is enabled to authorize the second network node to send the command to the POS device based on the network node identifier and an authorized network node identifier that represents a network node that is authorized to send a command associated with the secured function to the POS device.

In another exemplary embodiment, the method further includes authorizing the second network node to send the command to the POS device based on the network node identifier and the authorized network node identifier.

In another exemplary embodiment, the method further includes determining that the network node identifier corresponds to the authorized network node identifier.

In another exemplary embodiment, the method further includes sending, by the first network node, to the POS device over the one-to-one connection, an indication of the command responsive to the authorizing step.

In another exemplary embodiment, the authorizing step is further based on a restricted command that corresponds to a command associated with the secured function of the POS device that requires a network node to be authorized to send that command to the POS device.

In another exemplary embodiment, the method further includes determining that the command corresponds to the restricted command.

In another exemplary embodiment, the method further includes determining not to send the command to the POS device responsive to determining that the command corresponds to the restricted command responsive to determining that the network node identifier does not correspond to the authorized network node identifier.

In another exemplary embodiment, the method further includes determining to send the command to the POS device responsive to determining that the command does not correspond to the restricted command responsive to determining that the network node identifier does not correspond to the authorized network node identifier.

In another exemplary embodiment, the authorized network node identifier and the restricted command are stored in non-volatile memory of the first network node.

In another exemplary embodiment, the method further includes receiving, by the first network node, from the POS device over the one-to-one connection, an indication that the command was performed.

In another exemplary embodiment, the one-to-one connection is a serial hardwired connection such as USB, UART, or the like.

In another exemplary embodiment, the one-to-one connection is a peer-to-peer wireless connection such as Bluetooth, WiFi, or the like.

In another exemplary embodiment, the network node identifier includes an IP address.

In another exemplary embodiment, the network node identifier includes a network hostname.

In another exemplary embodiment, the POS device includes a printer and a cash drawer and the unsecured function of the POS device is associated with printing a sales receipt and the secured function of the POS device is associated with opening or closing the cash drawer.

In one exemplary embodiment, a first network node comprises a processor and a memory, with the memory containing instructions executable by the processor whereby the processor is configured to receive, from a second network node over a network, an indication that includes both a command associated with a POS device and an identifier associated with the second network node so that the first network node is enabled to authorize the second network node to send the command to the POS device based on the network node identifier and an authorized network node identifier that represents a network node that is authorized to send a command associated with the secured function to the POS device. Further, the POS device being operable to receive commands related to secured and unsecured functions of the POS device that are sent by the second network node to the first network node over the network and then conditionally sent by the first network node to the POS device over the one-to-one connection.

In one exemplary embodiment, a method is performed by a second network node that is operationally coupled to a first network node over a network, with the first network node being operationally coupled to a POS device over a one-to-one connection. Further, the POS device is operable to receive commands related to secured and unsecured functions of the POS device that are sent by the second network node to the first network node over the network and then conditionally sent by the first network node to the POS device over the one-to-one connection. The method comprises sending, to the first network node over the network, an indication that includes both a command associated with the POS device and an identifier associated with the second network node so that the first network node is enabled to authorize the second network node to send the command to the POS device based on the network node identifier and an authorized network node identifier that represents a network node that is authorized to send a command associated with the secured function to the POS device.

In another exemplary embodiment, a second network node comprises a processor and a memory, with the memory containing instructions executable by the processor whereby the processor is configured to send, to a first network node over a network, an indication that includes both a command associated with a POS device and an identifier associated with the second network node so that the first network node is enabled to authorize the second network node to send the command to the POS device based on the network node identifier and an authorized network node identifier that represents a network node that is authorized to send a command associated with the secured function to the POS device. Further, the POS device being operable to receive commands related to secured and unsecured functions of the POS device that are sent by the second network node to the first network node over the network and then conditionally sent by the first network node to the POS device over the one-to-one connection.

In one exemplary embodiment, a method performed by a POS device that is operationally coupled to a first network node over a one-to-one connection, with the POS device being operable to receive commands related to secured and unsecured functions of the POS device that are received by the first network node from a second network node over a network and then conditionally sent by the first network node to the POS device over the one-to-one connection. The method comprises receiving, from the first network node over the one-to-one connection, an indication of a command associated with the POS device, with the first network node being enabled to authorize the second network node to send the command to the POS device based on the network node identifier and an authorized network node identifier that represents a network node that is authorized to send a command associated with the secured function to the POS device.

In one exemplary embodiment, a POS device comprises a processor and a memory, with the memory containing instructions executable by the processor whereby the processor is configured to receive, from a first network node over a one-to-one connection, an indication that includes a command associated with the POS device. Further, the first network node is enabled to receive the command from a second network node over a network and authorize the second network node to send the command to the POS device based on the network node identifier and an authorized network node identifier that represents a network node that is authorized to send a command associated with the secured function to the POS device. In addition, the POS device is operable to receive commands related to secured and unsecured functions of the POS device that are received by the first network node from the second network node over the network and then conditionally sent by the first network node to the POS device over the one-to-one connection.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
by a first network node that is operationally coupled to a second network node over a network and operationally coupled to a point of sale (POS) device over a one-to-one connection, with the POS device being operable to receive commands related to secured and unsecured functions of the POS device that are sent by the second network node to the first network node over the network and then conditionally sent by the first network node to the POS device over the one-to-one connection,
receiving, from the second network node, an indication that includes both a command related to the POS device and a network node identifier associated with the second network node; and
determining to send the command to the POS device responsive to both determining that the command does not correspond to a restricted command and determining that the network node identifier does not correspond to an authorized network node identifier that represents a network node that is authorized to send a command associated with the secured function to the POS device, wherein the restricted command corresponds to a command associated with the secured function of the POS device that requires a network node to be authorized to send that command to the POS device, wherein the restricted command corresponds to a command associated with the secured function of the POS device that requires a network node to be authorized to send that command to the POS device.

2. The method of claim 1, further comprising:
determining that the network node identifier corresponds to the authorized network node identifier.

3. The method of claim 1, further comprising:
sending, by the first network node, to the POS device over the one-to-one connection, an indication of the command responsive to the authorizing step.

4. The method of claim 1, further comprising:
determining that the command corresponds to the restricted command.

5. The method of claim 1, further comprising:
determining not to send the command to the POS device responsive to determining that the command corresponds to the restricted command responsive to determining that the network node identifier does not correspond to the authorized network node identifier.

6. The method of claim 1, wherein the authorized network node identifier and the restricted command are stored in non-volatile memory of the first network node.

7. The method of claim 1, further comprising:
receiving, by the first network node, from the POS device over the one-to-one connection, an indication that the command was performed.

8. The method of claim 1, wherein the one-to-one connection is a serial hardwired connection.

9. The method of claim 1, wherein the one-to-one connection is a peer-to-peer wireless connection.

10. The method of claim 1, wherein the network node identifier includes an internet protocol (IP) address.

11. The method of claim 1, wherein the network node identifier includes a network hostname.

12. The method of claim 1, wherein the POS device includes a printer and a cash drawer and the unsecured function of the POS device is associated with printing a sales receipt and the secured function of the POS device is associated with opening or closing the cash drawer.

13. A first network node, comprising:
with the first network node being operationally coupled to a second network node over a network and operationally coupled to a point of sale (POS) device over a one-to-one connection, with the POS device being operable to receive commands related to secured and unsecured functions of the POS device that are sent by the second network node to the first network node over the network and then conditionally sent by the first network node to the POS device over the one-to-one connection; and a processor and a memory, the memory containing instructions executable by the processor whereby the processor is configured to:
receive, from a second network node over a network, an indication that includes both a command associated with a point of sale (POS) device and an identifier associated with the second network node; and
determine to send the command to the POS device responsive to both determining that the command does not correspond to a restricted command and determining that the network node identifier does not correspond to an authorized network node identifier that represents a network node that is authorized to send a command associated with the secured function to the POS device, wherein the restricted command corresponds to a command associated with the secured function of the POS device that requires a network node to be authorized to send that command to the POS device.

14. A method, comprising:
by a second network node that is operationally coupled to a first network node over a network, with the first network node being operationally coupled to a point of sale (POS) device over a one-to-one connection, with the POS device being operable to receive commands related to secured and unsecured functions of the POS device that are sent by the second network node to the first network node over the network and then conditionally sent by the first network node to the POS device over the one-to-one connection,
sending, to the first network node over the network, an indication that includes both a command associated with the POS device and a network node identifier associated with the second network node so that the first network node is enabled to determine to send the command to the POS device responsive to both determining that the command does not correspond to a restricted command and determining that the network node identifier does not correspond to the authorized network node identifier, wherein the restricted command corresponds to a command associated with the secured function of the POS device that requires a network node to be authorized to send that command to the POS device.

15. A second network node, comprising:
with the second network node being operationally coupled to a first network node over a network, with the first network node being operationally coupled to a point of sale (POS) device over a one-to-one connection, with the POS device being operable to receive commands related to secured and unsecured functions of the POS device that are sent by the second network node to the first network node over the network and then conditionally sent by the first network node to the POS device over the one-to-one connection; and
a processor and a memory, the memory containing instructions executable by the processor whereby the processor is configured to:
send, to a first network node over a network, an indication that includes both a command associated with the POS device and a network node identifier associated with the second network node so that the first network node is enabled to determine to send the command to the POS device responsive to both determining that the command does not correspond to a restricted command and determining that the network node identifier does not correspond to the authorized network node identifier, wherein the restricted command corresponds to a command associated with the secured function of the POS device that requires a network node to be authorized to send that command to the POS device.

16. A method, comprising:
by a point of sale (POS) device that is operationally coupled to a first network node over a one-to-one connection, with the POS device being operable to receive commands related to secured and unsecured functions of the POS device that are received by the first network node from a second network node over a network and then conditionally sent by the first network node to the POS device over the one-to-one connection,
receiving, from the first network node over the one-to-one connection, an indication of a command associated with the POS device, with the first network node being enabled to determine to send the command to the POS device responsive to both determining that the command does not correspond to a restricted command and determining that the network node identifier does not correspond to the authorized network node identifier, wherein the restricted command corresponds to a command associated with the secured function of the POS device that requires a network node to be authorized to send that command to the POS device.

17. A point of sale (POS) device, comprising:
with the POS device being operationally coupled to a first network node over a one-to-one connection, with the POS device being operable to receive commands related to secured and unsecured functions of the POS device that are received by the first network node from a second network node over a network and then conditionally sent by the first network node to the POS device over the one-to-one connection; and
a processor and a memory, the memory containing instructions executable by the processor whereby the processor is configured to:
receive, from a first network node over a one-to-one connection, an indication that includes a command associated with the POS device, with the first network node being enabled to determine to send the command to the POS device responsive to both determining that the command does not correspond to a restricted command and determining that the network node identifier does not correspond to the authorized network node identifier, wherein the restricted command corresponds to a command associated with the secured function of the POS device that requires a network node to be authorized to send that command to the POS device.

* * * * *